United States Patent [19]
Donald et al.

[11] Patent Number: 5,481,505
[45] Date of Patent: Jan. 2, 1996

[54] TRACKING SYSTEM AND METHOD

[75] Inventors: James B. Donald, Pawcatuck; Albert H. Nuttall, Old Lyme, both of Conn.; James H. Wilson, San Clemente, Calif.

[73] Assignee: The United States of America as represented by the Secretary of the Navy, Washington, D.C.

[21] Appl. No.: 446,117

[22] Filed: May 15, 1995

[51] Int. Cl.$^6$ ....................................................... G01S 3/80
[52] U.S. Cl. ............................. 367/130; 367/118; 367/124
[58] Field of Search ...................................... 367/118, 119, 367/121, 124, 129, 130, 901; 364/516

[56] References Cited

U.S. PATENT DOCUMENTS

5,216,640  6/1993  Donald et al. ........................... 367/118

*Primary Examiner*—Daniel T. Pihulic
*Attorney, Agent, or Firm*—Michael J. McGowan; James M. Kasischke; Prithvi C. Lall

[57]  ABSTRACT

A method and apparatus for detecting, processing and tracking sonar signals to provide bearing, range and depth information that locates an object in three-dimensional underwater space. An inverse beamformer utilizes signals from a towed horizontal array of hydrophones to estimate a bearing to a possible object. A matched field processor receives measured covariance matrix data based upon signals from the hydrophones and signals from a propagation model. An eight nearest neighbor peak picker provides plane wave peaks in response to output beam levels from the matched processor. A five-dimensional M of N tracker identifies peaks within the specified limit of frequency, bearing change over time, range and depth to specify an object as a target and to display its relative range and depth with respect to the array of hydrophones.

20 Claims, 6 Drawing Sheets

|  | DEPTH BIN 1 | DEPTH BIN 2 | DEPTH BIN 3 |
|---|---|---|---|
| RANGE BIN 1 | 4 | 2 | −1 |
| RANGE BIN 2 | 3 | (8) | 2 |
| RANGE BIN 3 | 0 | 6 | 5 |

TRACKING SYSTEM AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to sonar systems and more specifically to sonar systems particularly adapted for identifying the location of an underwater object.

(2) Description of the Prior Art

Conventional passive sonar systems detect acoustic signals emanating from an "underwater object;" that is, any device that moves through the water while emitting acoustic signals that sonar can detect. Torpedoes and submarines are examples of such "underwater objects."

Sonar systems employ a variety of technologies to detect and locate such underwater objects. Generally, however, acoustic signals from a specific object define a complex wavefronts and pass a towed horizontal array or a stationary vertical array of hydrophones at different times. U.S. Pat. No. 4,965,732 to Roy et al. for Methods and Arrangements for Signal Reception and Parameter Estimation and U.S. Pat. No. 5,216,640 to the same inventors as in this application for an Inverse Beamforming Sonar System and Method are examples of such sonar systems. Some sonar systems, such as disclosed in our prior patent, implement a beamforming process to correlate the signals received at each hydrophone and to decompose these signals into a signal representing the bearing to a particular underwater object.

Many other prior art beamforming processes typically obtain a bearing by time delaying the received signal from each hydrophone. However, the hardware for implementing this process is bulky and heavy. Shipboard constraints on available space and load weight often limit or even preclude on board systems using this technology. Moreover, this apparatus can only form a limited number of beams, and this limit can establish a maximum number of underwater objects that can be monitored simultaneously. Even when multiple underwater objects can be detected, confidence in that detection only exists if the individual underwater objects are widely spaced in azimuth. Otherwise it is possible that low intensity signals located between the individual beams will be lost. Many conventional sonar systems also use fixed threshold levels to avoid erroneous signal declarations from random noise emanating from the ocean, so low intensity signals from underwater objects also may not be detected because they do not reach the threshold.

U.S. Pat. No. 5,216,640 discloses a sonar system that measures plane wave energy at multiple points using a horizontal array of plane wave energy receptors such as hydrophones. An inverse beamforming processor generates output beam levels for analysis in a spectrum normalizer to yield spatially and spectrally normalized output beam levels. An eight nearest-neighbor peak-picker analyzes the normalized output beam levels to identify plane wave peaks that a three-dimensional M of N tracker uses to identify peaks within a specified limit of frequency and angle change over time. This system enables the detection, with confidence, of closely angularly spaced underwater objects even where signal-to-noise ratios are low. However, this system only provides bearing angle and frequency measurements (i.e., one-dimensional location of the underwater object relative to the sensing system such as the hydrophone array). This system cannot provide range and depth information that is necessary to locate the object in three-dimensional underwater space. Rather, independent systems, such as those using stationary vertical hydrophone arrays, supplement systems using inverse beamforming to obtain bearing information.

SUMMARY OF THE INVENTION

Therefore it is an object of this invention to provide a system and method for locating an object in three-dimensional underwater space.

Another object of this invention is to provide a method and apparatus for locating an object in three-dimensional underwater space by range, depth and azimuth from a predetermined location.

Still another object of this invention is to provide a method and apparatus for locating and tracking an object in three-dimensional underwater space.

Yet another of this invention is to provide a method and apparatus for locating and tracking an object in three-dimensional underwater space by utilizing frequencies of the signals emanating from the object and variations in the range and bearing to and depth of the object over time.

Still yet another object of this invention is to provide a method and apparatus for enabling passive sonar systems to track an underwater object in real time.

In accordance with one aspect of this invention, the location of an object in three-dimensional underwater space in relation to a predetermined location includes receiving acoustic signals from the object at the predetermined location by means of a towed horizontal array of acoustic transducers. Processing these acoustic signals provides an estimated bearing to a possible object. Processing signals from the array and a signal propagation model determines a beam value for each of different incremental locations at incremental ranges and depths along the estimated bearing. An individual incremental location with a peak beam value is then considered to be the location of the object in the three-dimensional underwater space.

In accordance with another aspect of this invention, apparatus for locating an object emitting acoustic signals in three-dimensional underwater space includes a receiver for the acoustic signals present in the underwater space. An estimator responds to the acoustic signals by estimating the bearing to a possible object. A beam value generator generates beam values for signals detected from different incremental locations at incremental ranges and depths along the estimated bearing. A location selector selects an incremental location with a peak beam value, and an interface provides the bearing from the predetermined location and the range and depth of the incremental location thereby to locate the object in three-dimensional underwater space.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
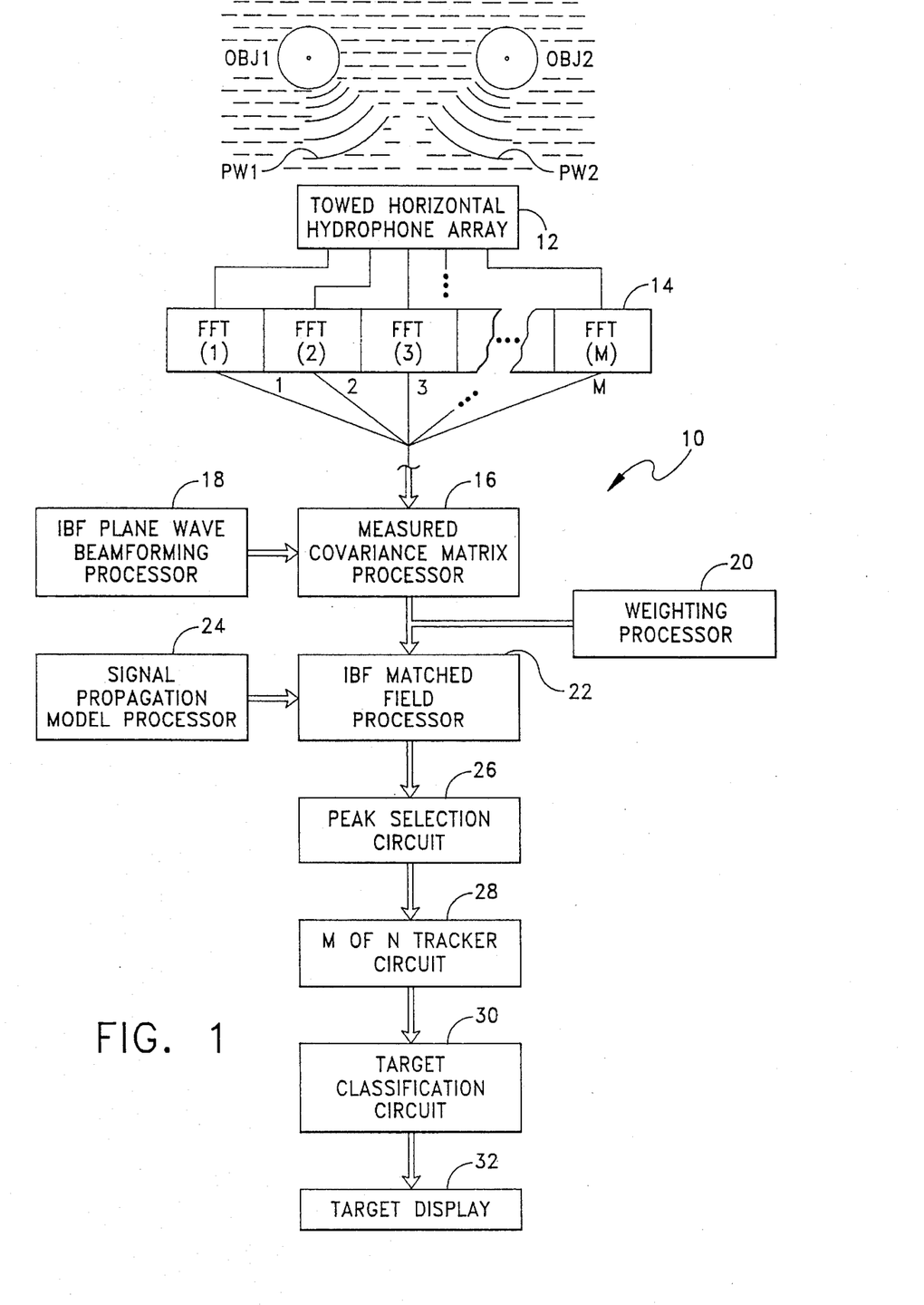
FIG. 1 is a block diagram of apparatus constructed in accordance with this invention.

The apparatus 10 shown in FIG. 1 includes a towed horizontal hydrophone array 12 that receives acoustic signals in the water for all potential sources including any underwater objects. OBJ1 and OBJ2 represent two objects that produce acoustic signals that radiate as multiple plane waves PW1 and PW2 respectively. Fast Fourier Transform (FFT) processors 14, shown as individual processors FFT(1) ... FFT(M), process signals from corresponding ones of M spaced hydrophones in the array 12. A conventional measured covariance matrix processor 16 receives the output signals from the FFT processors 14 and interacts with an inverse beamforming (IBF) plane wave beamformer processor 18 for producing an estimated bearing to a possible object.

The remaining portions of the apparatus 10 utilize the estimated bearing signal from the IBF plane wave beamformer 18 and covariance matrix data supplied by the measured covariance matrix processor 16 to produce a beam value for each of a plurality of incremental ranges and depths along the estimated bearing. A weighting processor 20 can provide appropriate weighting functions for the output of the measured covariance matrix processor 16.

An IBF matched field processor 22 uses the output of the measured covariance matrix processor 16 in its original or weighted form and signals from a signal propagation model processor 24. The processor 24 models the signal propagation path characteristics from each of a plurality of incremental locations located at incremental ranges and depths along the estimated bearing. The IBF matched field processor 22 then generates a correlation value for each such incremental location. A peak selection circuit 26 selects those incremental locations that exhibit a maximum with respect to adjacent incremental locations. The foregoing processors operate iteratively over time.

An "M of N" tracker circuit 28 comprises a processor that utilizes the succession signals from the peak selection circuit 16 during each iteration to eliminate false targets and enable a target classification circuit 30 to classify a possible object as a target. A target display 32 provides the track of the bearing and range to and depth of each target over time.

Figure 2:
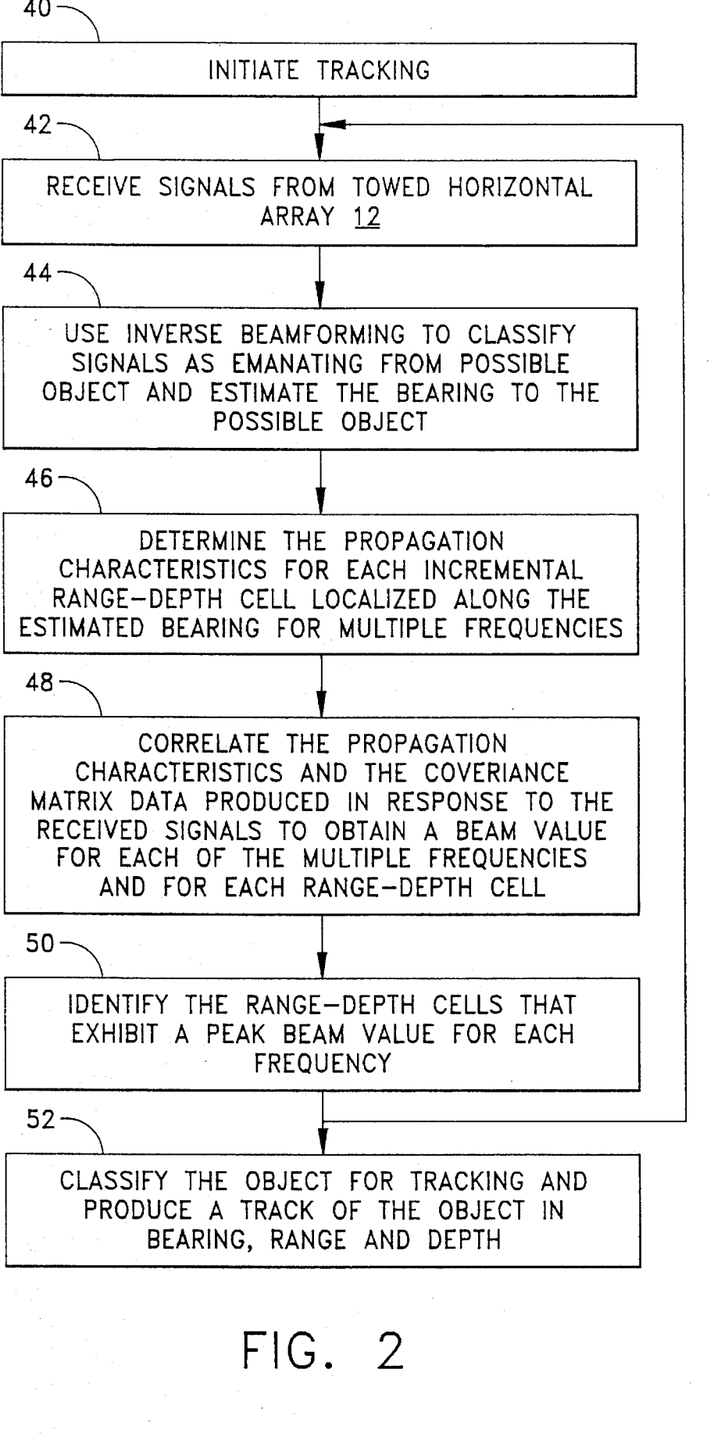
FIG. 2 is a flow chart of the process in accordance with this invention.

FIG. 2 discloses an operating procedure for the apparatus 10 in FIG. 1. For clarity, the procedure is described only in terms of tracking one underwater object. The procedure for tracking multiple objects is a straight forward expansion of the signal object procedure. Once an operator initiates tracking in Step 40, the apparatus begins to process signals from a towed horizontal array in Step 42. Inverse beamforming then, in Step 44, classifies signals as emanating from each possible object and estimates a bearing to each possible object.

In Step 46 the apparatus uses conventional procedures to determine the propagation characteristics for each of one or more paths between the array and each incremental range-depth cell localized along the estimated bearing or each bearing. These characteristics are also determined for a broad band of frequencies or for multiple narrowband frequencies, typically harmonics of a frequency that the possible object is known to generate.

In Step 48 the apparatus 10 correlates the propagation characteristics from the signal propagation model 24 and the covariance matrix data produced in response to the received signals to obtain a beam value for each of the multiple frequencies and for each range-depth cell or incremental location. In essence Step 48 assigns a signal plus noise-to-noise ratio estimate to each incremental location.

In Step 50 the apparatus identifies the range-depth cells or incremental locations that exhibit a peak beam value for each frequency for classification into a target to be tracked in bearing, range and depth in Step 52. As previously indicated the apparatus 10 operates in an iterative fashion, so upon completion of Step 50, the apparatus 10 loops back to Step 42 for a next iteration. In a typical application each iteration requires about one second.

The operation of the apparatus of FIG. 1 as outlined in FIG. 2 provides the location of an object in three-dimensional underwater space based upon several assumptions. First, numerous torpedo models exist that-are based upon propeller narrow band harmonic frequencies. These signals are particularly adapted for primary detection, classification and tracking. Other torpedo noises, that also are known, can be utilized for secondary classification information. Second, a high quality, sound-speed, and bottom geoacoustical database can be stored in memory for the geographical area of operation. Third, the system operates over a limited range and over a finite depth. This assumption allows IBF plane wave beamforming to detect and estimate the bearing of an object, such as a torpedo, based upon the foregoing narrow band propeller harmonics and other detectable events, such as broad band signals. Limiting the range also enables the signal propagation model to provide information for each incremental location along several bearing angles during each processing iteration. In one particular example the signal propagation model 24 operates effectively to produce a model to a range limit of 15,000 yards in steps of 300 yards, over a depth of 0 to 1,200 feet in steps of 50 feet for the estimated bearing angle and a pair of offset bearing angles on either side of the estimated bearing angle (for a total of five bearing angles). In this particular implementation, the signal propagation model produces 6000 information items during each iteration for each measured frequency. Such operations are well within the capability of standard array processing boards, particularly when operated in parallel.

When objects are within the finite range of the hydrophone array 12 in FIG. 1, a definite interference pattern exists between two or three dominant paths that are direct, surface, reflected or bottom bounced paths. For example, if two paths from the same object have different vertical arrival angles, then the two paths appear to arrive at two different conical angles ($\theta_1$ and $\theta_2$) at an M element, equally spaced line array. The signals from the plurality of FFT processors 14, the IBF plane wave beamformer processor 18 and measured covariance matrix 16 produces a covariance matrix for the two correlated plane waves according to:

$$C_{jk} = C_1(P) + C_2(P) + S_1 S_2 \cos[\theta - 2\pi(j-k)d\Delta\mu_a] e^{\frac{i2\pi f P d \Delta \mu_b}{d}} \quad (1)$$

where $$C_1(P) = S_1^2 e^{i2\pi f P d \cos\theta_1 / c} \quad (2)$$

and $$C_2(P) = S_2^2 e^{i2\pi f P d \cos\theta_2 / c} \quad (3)$$

$S_1$ is the amplitude of the first plane wave arrival, and $S_2$ is the amplitude of the second plane wave arrival. In these equations j and k refer to hydrophones j and k, respectively, $P=j-k$, $\theta$ is the bearing to the corresponding object, c is the speed of sound, f is the selected frequency being monitored and d is the hydrophone spacing. The terms $\Delta\mu_a$ and $\Delta\mu_b$ are given by:

$$\Delta\mu_a = \frac{\cos\theta_2 - \cos\theta_1}{2} \quad (4)$$

and $$\Delta\mu_b = \frac{\cos\theta_1 + \cos\theta_2}{2} \quad (5)$$

The interference term in equation (1) is not spatially homogenous; it depends not only on the relative spacing between hydrophone pairs, but also upon the absolute position of the hydrophones j and k. The IBF matched field processor 22 tries to beamform using the entire source correlation function by modeling signal propagation and matching the interference term in equation (1) to yield an estimate of source, range and depth. Equations (1), (2) and (3) are examples illustrating how the matched field processor 22 operates over such short ranges.

Once the estimated bearing is obtained, the process proceeds by analyzing a series of incremental locations, each at a given range and depth, over a line along the bearing (i.e., a nominal radial) and lines angularly offset with respect to the primary bearing or nominal radial (i.e., offset radials). The angular spacing between the various radials can be in the range from 1° to 5° depending on the spatial variability of bottom depth and the sound-speed profile between the array and the object to be detected. As indicated, the signal propagation model processor 24 produces inputs for the matched field processor 22 for each range-depth cell or incremental location over the volume defined by the depth and range limits and along each of the nominal and offset radials. Each estimate is defined by a steering vector $$\vec{E}(r_j, f_i, R_k, D_l, \theta = \theta_o, t_n) \quad (6)$$

that provides an estimate of the complex pressure at each array element wherein $r_j$ is the pressure, $f_i$ is the frequency, $R_k$ represents the measured range to the cell, $D_l$ represents the depth cell, and $\theta_o$ is the torpedo bearing at a time $t_n$. The matched field processor 22 correlates the information in this steering vector with the information of the measured covariance as follows:

$$B(\theta=\theta_o, R_k, D_l, f_i, t_n) = \vec{E} C \vec{E}^+ \quad (7)$$

where $\vec{E}^+$ is the complex transpose of $\vec{E}$ and wherein B is the beam or correlation output that varies with each range-depth cell or incremental location for every frequency detected from the torpedo.

Figure 3:
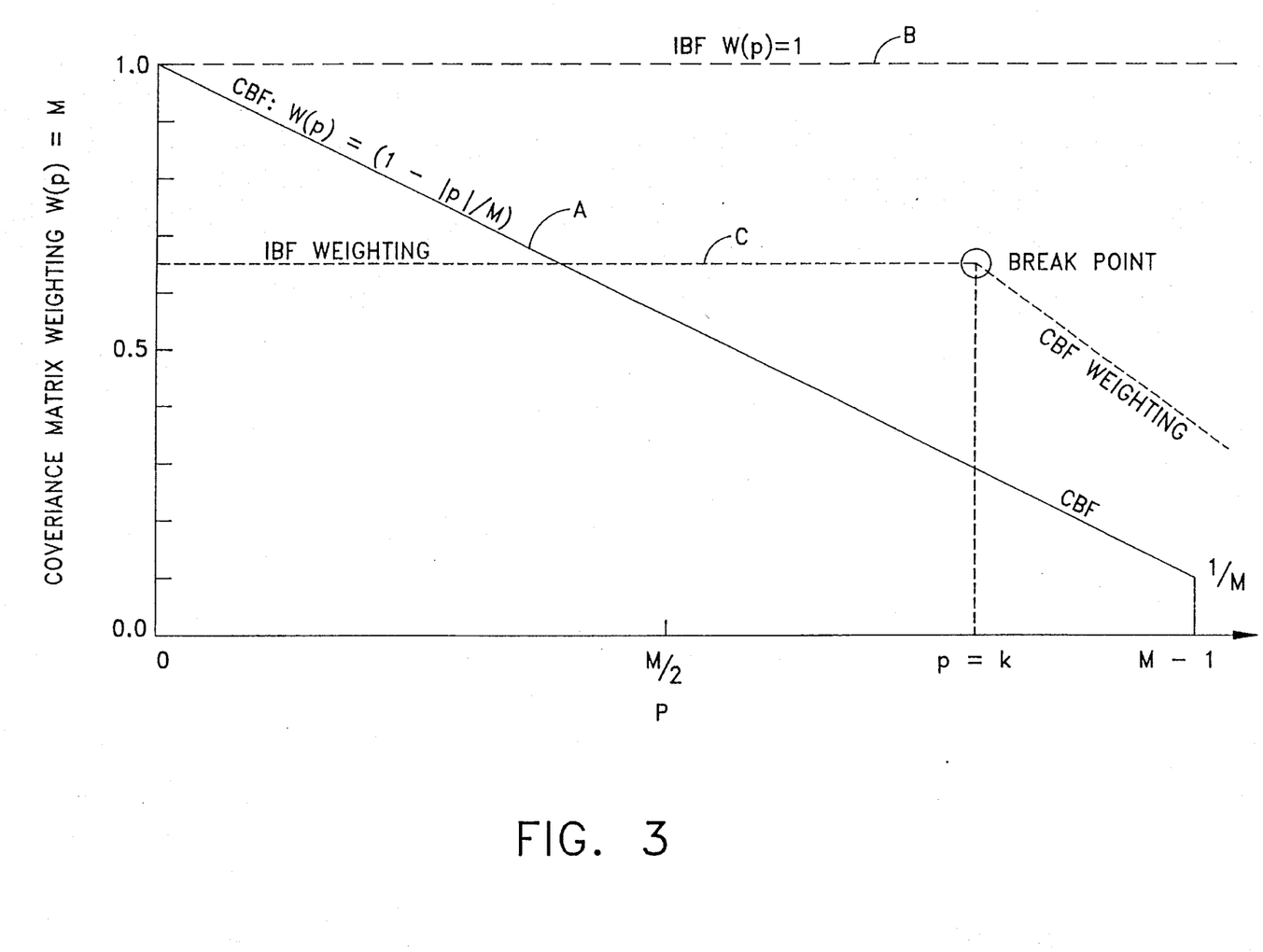
FIG. 3 is a graph of weighting for covariance pairs that is useful in understanding this invention.

As previously indicated, the signals from the covariance matrix processor 16 may be weighted as follows:

$$C_{ij} = W_{ij} C_{ij} \quad (8)$$

where $W_{ij}$ is an arbitrary weighting function. FIG. 3 graphically shows different transducer pair weighting functions. In the graph, p represents the distance between transducer pairs. The total number of transducers is given as m. Given m transducer, adjacent transducers are separated by a minimum distance, p=1. There are m−1 pairs of adjacent transducers. There are also pairs of transducers separated by twice the minimum distance such that p=2; there are only m−2 pairs of these transducers. The maximum distance that a pair of transducers can be separated is at extreme portions of the array, p=m−1. There is only one pair of transducers at this distance. The acoustic data is weighted by the relationship of the transducers from which it is received. The weighting for the transducers is determined by the number of transducers, m. Line A on FIG. 3 shows the weighting for conventional beamforming (CBF) weighting. CBF weighting is based on the complement of the ratio of the distance between the transducers in the pair, p, to the number of transducers, m. There are not any pairs of transducers with separation on greater than m−1,; therefore, the weighting can be zero. Line B represents IBF having equal weighting of signals from all transducer pair spacings. Line C represents a weighting function that uses equal weighting for all transducer pair separations until a present separation value, k, is achieved. At greater separations, CBF weighting is applied to the transducer pairs. The point where IBF weighting ends and CBF weighting begins is termed as the break point. Stated mathematically, the inverse beamforming function as a weighting WIBF for $\theta=\theta_o$ is:

$$WIBF(\theta_0) = \frac{1}{2}(k+1) \sum_{p=-k}^{p=+k} C(p) q$$

$$+ \left( \frac{m}{m-(k+1))(m-k)} \right) \times$$

$$\left( \sum_{p=k+1}^{p=m-1} C(p) \left(1 - \frac{|p|}{m}\right) q + \sum_{p=-(m-1)}^{p=-(k+1)} C(p) \left(1 - \frac{|p|}{m}\right) q \right)$$

where $$q = e^{(\frac{2i\pi f p d \cos\theta}{c})}$$

and $$1 \leq k \leq (m-1)$$

A particular weighting function can be selected to optimize results for a particular set of environmental variables as known in the art. As previously indicated, the object of this process, using either weighted or unweighted covariance matrix data is to yield a beam value for each range-depth cell or incremental location along each of the nominal or offset radials and for each of multiple frequencies being measured. For example, in one particular embodiment the process establishes values at three frequencies in which the second and third frequencies are higher order harmonics of the first frequency.

The use of multiple frequencies enhances the confidence in the resulting selection of a range-depth cell or incremental location as the location of a valid underwater object. In strong convergence zone environments, very high side lobes can appear in all convergence zones even when the source is only in one of the convergence zones. Thus the output of the IBF matched field processor 22 can, in appropriate environmental conditions, have high peak values in several range-depth cells during a single time period making it difficult to identify and track a true target.

The above-identified weighting function also provides a partial solution to this problem. When a plane wave beamformer processor assumes a source at infinite range, it steers a beam for a particular frequency such that the center of a main lobe lies along an azimuth at which a maximum occurs. Attendant side lobes then peak along other azimuths. The weighting of the covariance matrices for each frequency and the use of plane wave beamformers (i.e., matched field processors) for multiple frequencies alters the location of the side lobes range-depth cells at individual frequencies weighting. Specific weighting selections that optimize performance are known and can be determined empirically from measured data. Generally, weighting is chosen to optimize signal gain or to provide low weighting to spatial separation where the noise spatial coherence is high. The combination of the weighted covariance matrixes for each frequency then provide one track because the main lobe essentially receives triple amplification while the location of side lobes will move from cell to cell at different frequencies and weightings.

Figure 4:
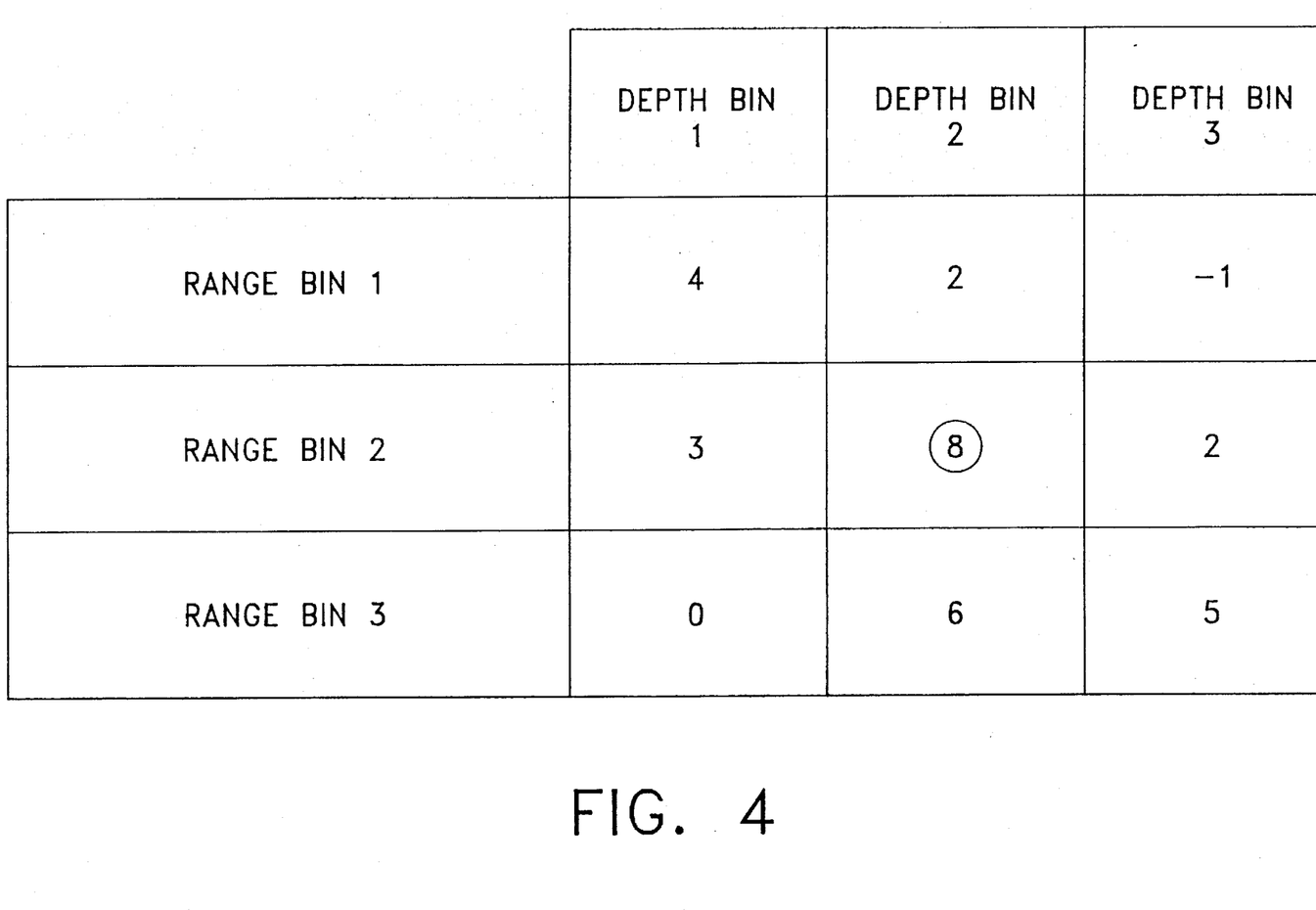
FIG. 4 describes the operation of one of the components of the apparatus shown in FIG. 1.

Basically the output of the IBF matched field processor 22 can be considered as a series of beam values distributed among a matrix of range and depth bins or range-depth cells as shown in FIG. 4. The peak selection circuit 26 monitors each bin or incremental location to determine if that cell contains a value that exceeds the values of the eight surrounding bins. In this particular example, the range-depth cell defined as Range Bin 2 and Depth Bin 2 contains such a maximum. The operation of this circuit, commonly called eight nearest neighbor peak picker, is known. Peak values are determined for the entire array of range-depth cells along each of the nominal and offset azimuth radials.

The M of N tracker circuit 28 in FIG. 1 acts as filter that disregards transient occurrences of various maxima. Such tracker circuits employ various frequency characteristics of the potential objects, such as frequency characteristics that might exist during startup of a torpedo. In this particular apparatus, the circuit 28 comprises a five-dimensional tracker that monitors correlation peak as a function of bearing, frequency, range, depth and time.

Figure 5:
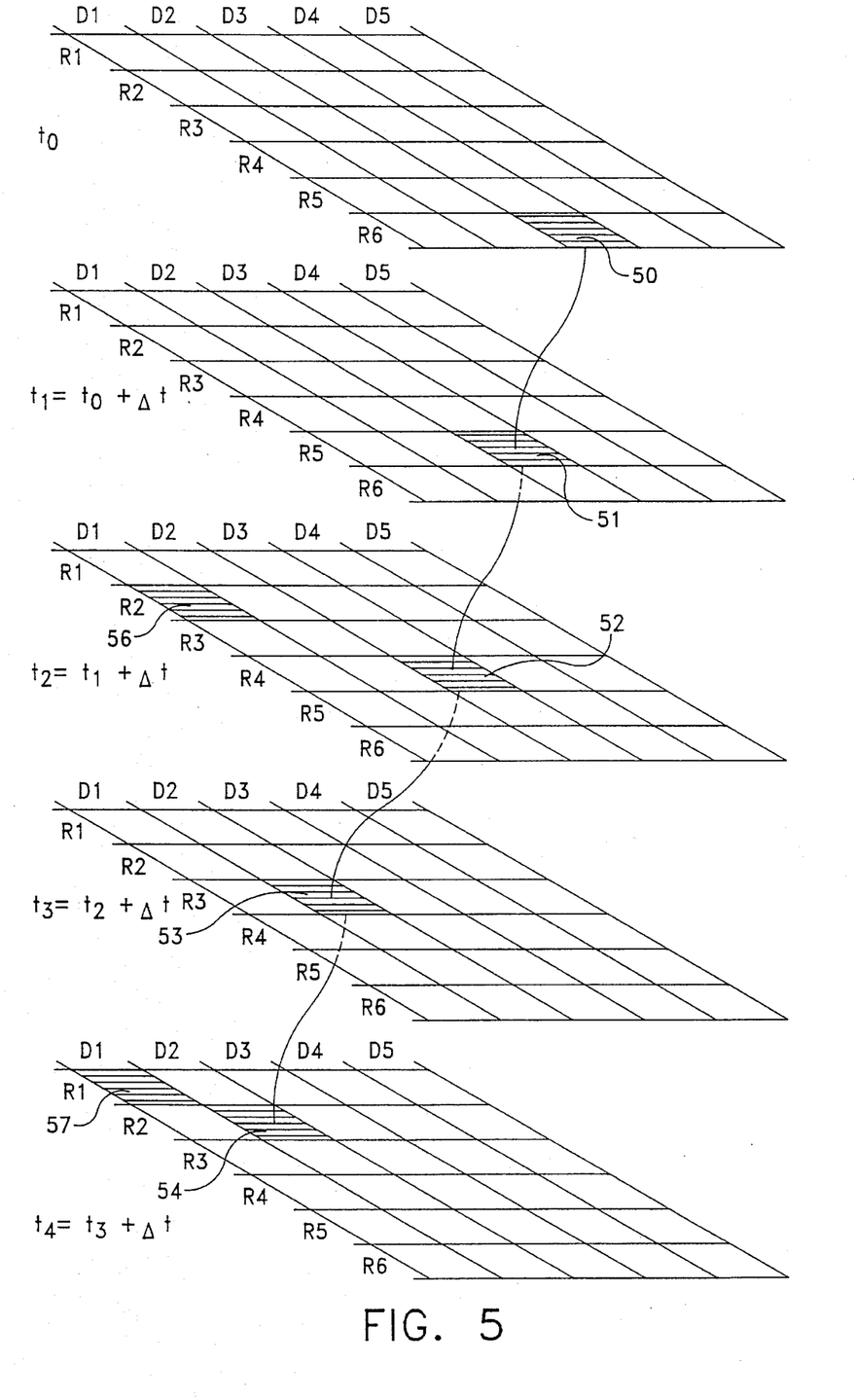
FIG. 5 depicts one mode of operation of the apparatus shown in FIG. 1.
Figure 6:
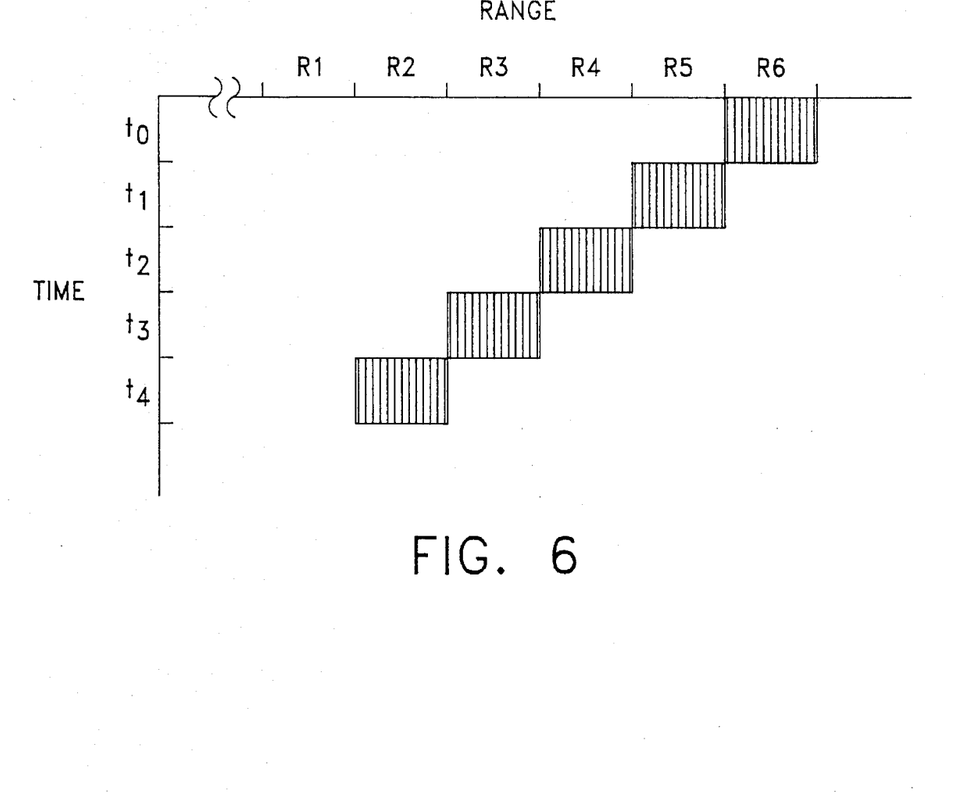
FIG. 6 depicts a typical of display of range information produced by the apparatus in FIG. 1.
Figure 7:
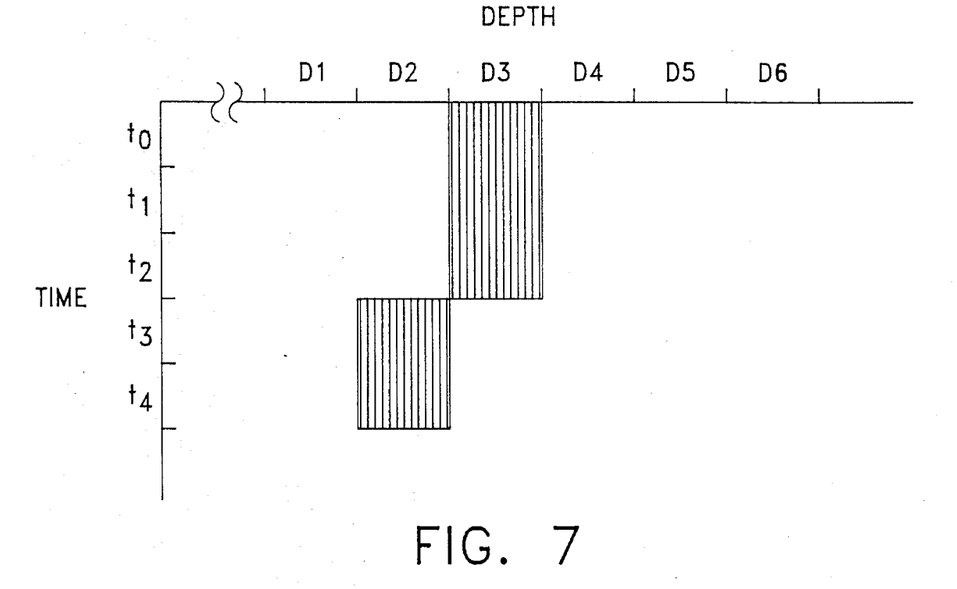
FIG. 7 depicts a typical representation of depth information as provided by the apparatus in FIG. 1.

FIG. 5 depicts interaction between the peak selection circuit 26 and the tracker circuit 28 and the target display 32. During each successive time interval the possible object is moving along a particular azimuth radial toward the hydrophone array 12 and slowly rising. The particular object is shown as being in range-depth cells 50, 51, 52, 53 and 54 in the intervals $t_0$ through $t_4$ respectively. The tracker circuit 28 monitors these signals to produce a classification of the range cell as being the source of a target. Spurious noise can produce false target designations, such as shown in range-depth cells 55, 56 and 57 at times $t_1$, $t_2$ and $t_4$. However, such designations are not tracked because they do not have a sufficient time duration. The M of N tracker 28 filters them from the target display 32. Consequently a conventional target display 32 provides range versus time and depth versus time patterns as shown in FIGS. 6 and 7. FIG. 6 depicts a target advancing toward the acoustic array 12 in FIG. 1. FIG. 7 depicts a target that is ascending over time and moves from one set of range-depth cells at one depth to an adjacent set at another depth over the time intervals $t_2$ and $t_3$.

The advantages of the present invention are numerous. The apparatus shown in FIG. 1 allows the use of towed horizontal transducer array and inverse beamforming to provide conventional bearing information range, and depth with the addition of information for locating an object in three-dimensional underwater space. Inverse beamforming also facilitates the identification of an object as a possible target. Correlating measured and modeled signals for multiple frequencies in the matched field processor enables the designation of a particular incremental location as the site of a target, even though the correlation peaks in noise-only range-depth cells may be within only a few decibels of a correlation peak in the signal range-depth cell. The use of weighting enables only one track to be output for any object from the tracker circuit thereby to give estimates of torpedo bearing, range and depth during each iteration from which target velocity can be determined over multiple iterations. In one embodiment, each iteration requires about one second. Consequently the displays, such as shown in FIGS. 6 and 7 are effectively real time displays that depict the tracks of a particular target or multiple targets in range and depth with a high degree of confidence.

This invention has been disclosed in terms of certain embodiments with particular weighting functions, covariance functions and other specific implementations. It will be apparent that many modifications can be made to the disclosed apparatus without departing from the invention. It also will be apparent that all of the above advantages may be implemented on apparatus comprising a variety of computational hardware components that are capable of evaluating the mathematics of the various equations in real time. Therefore, it is the intent of the appended claims to cover all such variations and modifications as come within the true spirit and scope of this invention.

What is claimed is:

1. A method for locating, in three-dimensional underwater space and in relation to a predetermined location, an object emitting acoustic signals comprising the steps of:

receiving acoustic signals including the acoustic signals from the object at the predetermined location by means of a towed, horizontal array of acoustic transducers;

estimating a bearing to the object in response to the received acoustic signals;

generating beam values for signals received by said acoustic transducers from different incremental locations at incremental ranges and depths along the estimated bearing;

selecting an individual incremental location with a peak beam value; and providing bearing, range and depth information from the predetermined location to the incremental location thereby locating the object in three-dimensional underwater space.

2. A method as recited in claim 1 wherein said step of generating beam values additionally includes generating beam values along bearings offset from the estimated bearing, and said step of selecting an incremental location includes determining the peak beam value from all beam values from the estimated and offset bearings.

3. A method as recited in claim 1 wherein each of said beam values is generated for each of a plurality of frequency bands and over time whereby said step of providing bearing, range and depth information additionally comprises providing frequency information of said received acoustic signal, and wherein the method additionally comprises the step of analyzing the provided frequency information for obtaining further information about object.

4. A method as recited in claim 3 wherein said step of generating beam values is repeated at regular intervals whereby the bearing, depth, range and frequency information is provided as a function of time.

5. A method as recited in claim 1 wherein said step of generating beam values is repeated at regular intervals whereby the bearing, depth and range information is provided as a function of time.

6. A method as recited in claim 5 further comprising the step of deploying an array of acoustic transducers before the step of receiving acoustic signals, said step of estimating a bearing includes inverse beamforming processing the signals from each transducers in the array.

7. A method as recited in claim 6 wherein said beamforming processing uses different frequencies and multipath analysis.

8. A method as recited in claim 7 wherein said step of generating beam values from an incremental location includes obtaining a correlation value for each frequency and for each incremental location.

9. A method as recited in claim 8 wherein said step of obtaining a correlation value includes the step of correlating the results of a propagation model for each measured frequency and each incremental location along the bearing and a measured covariance matrix for the signals from the transducer array.

10. A method as recited in claim 8 wherein said step of selecting an individual incremental location includes the step of determining peak values based upon an inverse beamformer eight nearest neighbor peak picker analysis.

11. A method as recited in claim 10 wherein said step of selecting an individual incremental location additionally includes analyzing the succession of peak values in an M of N tracker.

12. A method as recited in claim 11 wherein said M of N tracker is a five-dimensional tracker based upon correlation peak values versus bearing, frequency, range, depth and time.

13. Apparatus for locating, in three-dimensional underwater space and in relation to a predetermined location, an object emitting acoustic signals, said apparatus comprising:

a receiver means having a towed horizontal array of transducers for obtaining acoustic signals including the acoustic signals from the object at the predetermined location;

an estimating means connected to said receiver means and responsive to the processed acoustic signals for estimating the bearing to a possible object;

a beam value generating means for generating beam values for signals detected from different incremental locations at incremental ranges and depths along the estimated bearing;

a location selection means joined to said estimating means for selecting an individual incremental location with peak beam value;

a locating means for providing the bearing to, the predetermined location to, and the range and depth of the incremental location thereby the object in three-dimensional underwater space and designating the object as a target; and a display means for displaying the location of the target joined to said locating means.

14. Apparatus as recited in claim 13 wherein said estimating means includes:

a Fast Fourier Transform processing means joined to each transducer;

an inverse plane wave beamforming means joined to process the output signals from said Fast Fourier Transform processing means; and a covariance matrix data means using signal from said receiver means for generating measured covariance matrix data.

15. Apparatus as recited in claim 14 additionally comprising a weighting means joined to said covariance data means for weighting the values of the signals.

16. Apparatus as recited in claim 14 wherein said beam value generating means comprises:

a signal propagation model means for generating a model for the plurality of range-depth cells; and an inverse beam forming matched field processing means responsive to said signal propagation means and said measured covariance matrix means for producing a beam value for each of the range-depth cells, said signal propagation model means being joined to said inverse beamforming matched field processing means.

17. Apparatus as recited in claim 16 wherein said inverse beamforming matched field processing means produces correlation values for each of a plurality of acoustic signal frequencies from data received from said signal propagation model means and said covariance data means.

18. Apparatus as recited in claim 17 wherein the beam value for each incremental location represents a correlation value and said location selection means includes a nearest neighbor peak picker circuit means for identifying each incremental location for which the correlation value exceeds the correlation value in each adjacent incremental location.

19. Apparatus as recited in claim 18 wherein said apparatus operates in an iterative fashion and said locating means includes an M of N tracker means for tracking the correlation values as a function of bearing, frequency, range, depth and time over a series of iterations.

20. Apparatus as recited in claim 19 wherein said display means includes means for displaying, as functions of time, the range to, the depth of and the bearing to the target.

* * * * *